(12) United States Patent
Chen et al.

(10) Patent No.: US 7,551,554 B2
(45) Date of Patent: Jun. 23, 2009

(54) FRAGMENTING A PACKET

(75) Inventors: Allen P. Chen, Cupertino, CA (US); Jayakumar Natarajan, Fremont, CA (US); Siddharth C. Sheth, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1474 days.

(21) Appl. No.: 09/727,393

(22) Filed: Nov. 29, 2000

(65) Prior Publication Data

US 2002/0064176 A1     May 30, 2002

(51) Int. Cl.
*H04L 12/56* (2006.01)
*G06F 15/16* (2006.01)

(52) U.S. Cl. ...................... 370/229; 709/236
(58) Field of Classification Search ............. 370/230.1, 370/235, 389, 395.1, 398, 395.41, 395.52, 370/419, 449, 461, 465, 466, 471, 474, 535, 370/912, 395.44, 346–349, 412, 392, 229; 709/236, 238; 710/100

See application file for complete search history.

(56) References Cited

U.S. PATENT DOCUMENTS

| | | | | |
|---|---|---|---|---|
| 4,667,321 A | * | 5/1987 | Goodman | 370/536 |
| 5,440,545 A | * | 8/1995 | Buchholz et al. | 370/426 |
| 5,497,371 A | * | 3/1996 | Ellis et al. | 370/412 |
| 5,883,894 A | * | 3/1999 | Patel et al. | 370/438 |
| 5,949,789 A | * | 9/1999 | Davis et al. | 370/452 |
| 6,026,093 A | * | 2/2000 | Bellaton et al. | 370/412 |
| 6,072,772 A | * | 6/2000 | Charny et al. | 370/229 |
| 6,105,122 A | * | 8/2000 | Muller et al. | 712/1 |
| 6,144,662 A | * | 11/2000 | Colmant et al. | 370/390 |
| 6,151,318 A | * | 11/2000 | Woodward et al. | 370/392 |
| 6,249,528 B1 | * | 6/2001 | Kothary | 370/466 |
| 6,320,859 B1 | * | 11/2001 | Momirov | 370/395.1 |
| 6,330,602 B1 | * | 12/2001 | Law et al. | 709/224 |
| 6,345,345 B1 | * | 2/2002 | Yu et al. | 711/151 |
| 6,453,357 B1 | * | 9/2002 | Crow et al. | 709/236 |
| 6,484,209 B1 | * | 11/2002 | Momirov | 709/238 |
| 6,654,370 B1 | * | 11/2003 | Quirke et al. | 370/389 |
| 6,658,010 B1 | * | 12/2003 | Enns et al. | 370/401 |
| 6,671,758 B1 | * | 12/2003 | Cam et al. | 710/100 |
| 6,721,302 B1 | * | 4/2004 | Alastalo | 370/346 |
| 6,847,644 B1 | * | 1/2005 | Jha | 370/392 |
| 6,854,025 B2 | * | 2/2005 | Knight et al. | 710/22 |
| 2002/0159393 A1 | * | 10/2002 | Smith et al. | |

* cited by examiner

*Primary Examiner*—Gregory B Sefcheck
(74) *Attorney, Agent, or Firm*—Fish & Richardson P.C.

(57) ABSTRACT

A programmable intra-packet switching method includes a port polling process which polls, in a systematic fashion, data ports connected to a network to determine which port, if any, contains a data packet available for processing. A packet fragmentation process fragments the available data packet into at least one data cell having a defined size, wherein this fragmentation continues until a user-defined number of cells are generated.

41 Claims, 4 Drawing Sheets

1

FRAGMENTING A PACKET

TECHNICAL FIELD

This invention relates to packet processing.

BACKGROUND

Networks (e.g., local area networks, wide area networks, intranets, extranets, or the Internet) typically include a backbone that transmits a communication signal (e.g., optical, electrical, or wireless) from a source to signal converters positioned at various points along this network backbone, which convert the data signal to a form usable by electrical data signal processing circuitry.

On packet switched networks, data is transported across these backbones in data chunks known as packets. Each packet has a destination address included in the packet's header. When these packets arrive at their destination, they are reassembled and provided to the destination device.

The signal processing circuitry that receives these data packets often has multiple data ports. Each port holds a data packet in queue for processing. During processing, each data port is polled to determine if it has a data packet available for processing. If such a packet is available, the packet is processed into a form usable by the device receiving the packet. Once this packet is fully processed, the polling process is once again initiated to determine if any other port has a packet available for processing.

Packets vary in length from small packets (approximately 64 bytes) to large packets (approximately 64 kilobytes). Whenever a large packet is received by a port and subsequently processed, the polling procedure is stalled until that large packet is fully processed. All other packets waiting to be processed on any other ports will be delayed until after the processing of the large packet is completed.

DETAILED DESCRIPTION

Figure 1:
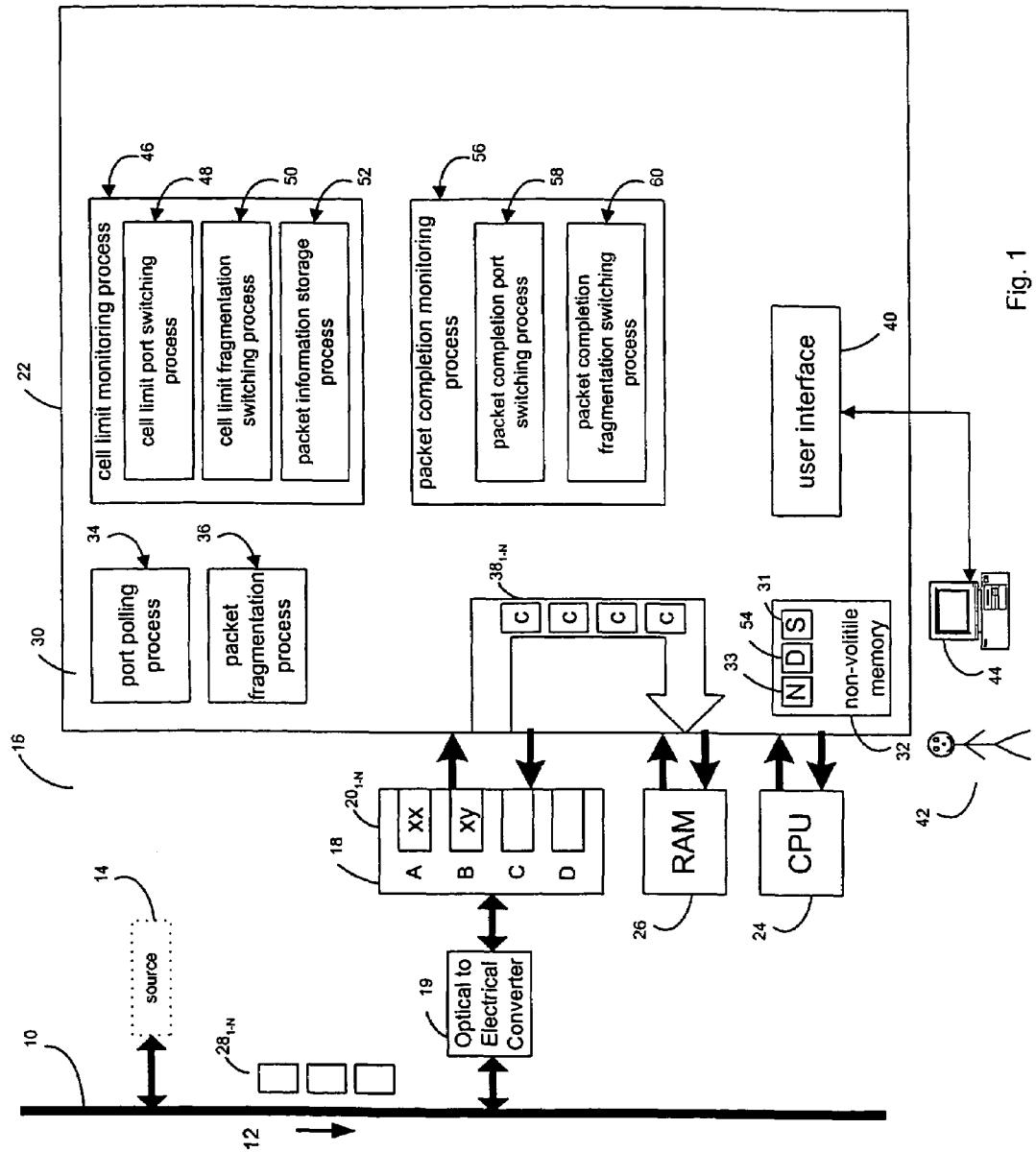
FIG. 1 is a diagrammatic view of a programmable intra-packet switching process.

Referring to FIG. 1, a network 10 is used to transfer a data signal 12 from a source 14 to a network signal processing system 16. As stated above, network 10 can use any medium (e.g. electrical, optical, wireless, and so forth) and be of any type (e.g., a local area network, a wide area network, an intranet, an extranet, the Internet, Ethernet, Arcnet, Token Ring, packet-switched, or circuit-switched). Source 14 and network signal processing system 16 can be incorporated into any device on a network, such as a printer, a personal computer, a router, a network server, a network interface card, or a cable modem.

Network signal processing system 16 includes a framer chipset 18, having one or more data ports $20_{1-N}$. A typical example of framer chipset 18 is a PMC Sierra PMC5351 chip, available from Wyle Electronics of Irvine, Calif. While framer 18 is shown to have only four discrete ports (namely "A", "B", "C", and "D"), there could be more or less than four as needed. A signal converter may be utilized to convert data signal 12 received from network 10 into a signal usable by network signal processing system 16. For example, if network 10 is an optical network, an optical to electrical signal converter 19 may be incorporated between network 10 and framer chip 18 to convert the optical light-based signals into electrical-based signals.

Network signal processor circuit 22 interfaces with framer chipset 18, central processing unit (CPU) 24, and random access memory 26 using a high speed bus system, such as a local memory bus, a PCI bus, or a Utopia bus. A typical example of network signal processor circuit 22 is an Intel IXF6402 Asynchronous Transfer Mode/Packet Over Sonet (ATM/POS) processor.

In packet-switching networks (as opposed to circuit-switching networks), data signal 12 is transported in the form of packets $28_{1-N}$ of varyious sizes. As stated above, the size of packets $28_{1-N}$ can vary in size by orders of magnitudes (e.g., 64 bytes vs. 64 kilobytes).

As packets $28_{1-N}$ are received by framer chip 18, the individual data packets are stored in ports $20_{1-N}$ until these packets can be processed by network signal processor circuit 22. In order to balance the load between ports $20_{1-N}$ when a large packet is received for processing, a programmable intra-packet switching process 30 is executed on network signal processor circuit 22. Typically, intra-packet switching process 30 is stored on some form of non-volatile memory 32 (e.g., ROM, PROM, EEPROM).

Intra-packet switching process 30 includes a port polling process 34 for polling, in a systematic fashion, the individual data ports $20_{1-N}$ connected to network 10 to determine if any of these ports $20_{1-N}$ contains a data packet for processing. For example, if data packets $28_{1-N}$ include two packets (namely packets XX and XY), where XX is a relatively large packet (1500 bytes) and XY is a relatively small packet (approximately 100 bytes), these two packets (XX and XY) would be stored in any two data ports (e.g., ports "A" and "B" respectively of data ports $20_{1-N}$). As stated above, port polling process 34 systematically polls ports $20_{1-N}$ to determine if any port has a data packet available for processing. In this example, polling process 10 would poll port "A" of ports $20_{1-N}$ and determine that port "A" indeed has a data packet (XX) available for processing.

Intra-packet switching process 30 includes a packet fragmentation process 36 which is responsive to port polling process 34 determining that port "A" of ports $20_{1-N}$ has a data packet (XX) available for processing. Packet fragmentation process 36 fragments packet (XX) stored on port "A" of ports $20_{1-N}$ into one or more data cells $38_{1-N}$, where each cell has a predefined size 31. This predefined size 31 is programmable and stored on non-volatile memory 32, where the size of the cells are chosen to maximize the processing efficiency of the system. While the size of these cells is user definable, a typical size is 53 bytes, which adheres to the Asynchronous Transfer Mode (ATM) guidelines. Data cells $38_{1-N}$ are stored on memory 26 for later processing (e.g. transmission, storage, and so forth).

Packet fragmentation process 36 continues fragmenting data cell (XX) until a user-defined number of cells 33 are generated or, alternatively, the data packet (XX) is fully fragmented. Again, this user-defined number of cells 33 is programmable and stored on non-volatile memory 32. The number can be chosen to maximize the processing efficiency of the system. A typical value for this cell number limit is three.

A user interface 40 allows a user 42 to program, among other things, the maximum number of cells 33 and the defined size 31 of the cells into which data packets $28_{1-N}$ are fragmented. User interface 40 can be any form of interface which allows the user to program these values, such as: DIP switches; LCD/LED displays; circuit board jumpers; or an HTTP-based web server in combination with an HTTP-based web browser (running on a remote computer 44).

A cell limit monitoring process 46 monitors the number of cells $38_{1-N}$ produced by packet fragmentation process 36 to determine if the user-defined number of cells 33 has been produced. As stated above, packet fragmentation process 36 continues fragmenting data packet (XX) until a user-defined number of cells 33 is produced, or until the data packet (XX) is fully fragmented. By setting a limit on the number of cells that can be produced before the port being serviced is switched, port loading can be controlled and reduced. Specifically, since the packet (XX) in port "A" is substantially larger than the packet (XY) in port "B", if fragmentation process 36 was allowed to continue to fragment data packet (XX) until the data packet was completely fragmented, a bottleneck would be created where the processing of all other ports would be stalled until the large packet (XX) in port "A" was completely fragmented. However, by limiting the number of cells that can be produced before another port is polled and another packet, if available, is processed, bottlenecks can be reduced and throughput increased.

Cell limit monitoring process 46 includes a cell limit port switching process 48 which is responsive to cell limit monitoring process 46 determining that the user defined number of cells 33 have been generated. If this occurs, cell limit port switching process 48 initiates port polling process 34 to determine if any other port contains a data packet which is available for processing. If cell limit port switching process 48, via port polling process 34, determines that another port has a data packet available for processing, cell limit fragmentation switching process 50 initiates packet fragmentation process 36 to fragment the data packet on the other port into cells having a user defined size 31. This fragmentation process continues until the user defined number of cells 33 is generated, or the packet is fully fragmented.

Expanding on the example stated above, let's assume that user 42 programmed the user defined number of cells 33 to be twenty-five and programmed the cell size 31 to be fifty-three bytes. As stated above, two packets (namely packets XX and XY) are stored on ports "A" and "B" respectively, where XX is a relatively large packet (1500 bytes) and XY is a relatively small packet (approximately 100 bytes). Packet fragmentation process 36 would repeatedly fragment data packet XX into fifty-three byte cells. Cell limit monitoring process 46 would monitor the number of fifty-three byte cells generated by packet fragmentation process 36 until twenty-five cells have been produced. At this point, 1,325 bytes of the 1,500 byte packet (XX) have been fragmented into fifty-three byte cells. Cell limit port switching process 48 would initiate port polling process 34 to poll the other ports ("B", "C" and "D") to determine if any of these ports have a data packet available for processing. In this example, port polling process 34, upon polling port "B", would determine that a data packet (XY) is available for processing on port "B" and report this to cell limit port switching process 48. Cell limit fragmentation switching process 50, upon being informed that data packet (XY) is available on port "B", will initiate packet fragmentation process 36 and packet (XY) will be fragmented into fifty-three byte cells.

As the packet (XY) on port "B" is only one-hundred bytes in length, packet (XY) would be completely fragmented into only two fifty-three byte cells. As will be explained below in greater detail, port polling process 34 would be once again initiated to determine if any other port (namely ports "C", "D" and "A") has a packet available for processing. Port polling process 34 would poll port "C" and find that no data packet was available. Port polling process 34 would then poll port "D" and, again, find that no data packet was available for processing. When port polling process 34 polls port "A", it would find the remainder of packet (XX), namely the 175 byte "chunk" not initially fragmented. Packet fragmentation process 36 would then fragment this packet "chunk" into four fifty-three byte cells.

Whenever cell limit monitoring process 46 determines that the user defined number of cells have been generated and cell limit port switching process 50 determines that another data packet is available for processing, the processing (i.e. fragmentation) of the first data packet is paused in lieu of processing (i.e. fragmenting) the second data packet. Accordingly, in order to facilitate subsequent processing of the first packet's "chunk" reminder, information concerning the first data packet must be stored for later retrieval.

Packet information storage process 52 is responsive to cell limit port switching process 48 determining that another port contains a data packet that is available for processing. Once it is determined that another port has a data packet available for processing, packet information storage process 52 stores various data elements 54 concerning the data packet currently being processed. These data elements 54 are stored on non-volatile memory 32. Data elements 54 can include information concerning: the overall length of the data packet currently being processed; the length of the packet remainder to be processed; the length of the portion of the packet that has already been processed; a packet truncation indicator showing that the packet has not been completely processed; or a Packet-Over-Sonet (POS) header for use in optical networks. Accordingly, by storing data elements 54 on non-volatile memory 32, subsequent fragmentation of the remainder of a data packet (not completely fragmented due to cell number limit 33) can be easily achieved.

As stated above, once packet fragmentation process 36 starts to fragment a data packet, this fragmentation process 36 will continue until one of two things occur: (a) a user defined number of cells 33 is generated; or (b) the data packet being fragmented is completely fragmented. Intra-packet switching process 30 includes a packet completion monitoring process 56 which monitors the status of packet fragmentation process 36 to determine if the packet being processed (i.e. fragmented) has been completely fragmented into cells $38_{1-N}$. Packet completion monitoring process 56 includes a packet completion port switching process 58 which is responsive to packet completion monitoring process 56 determining that the data packet currently being processed (i.e. fragmented) has been completely fragmented into cells $38_{1-N}$. If this occurs, packet completion port switching process 58 initiates port polling process 34 to determine if any other port has a data packet available for processing. If packet completion port switching process 58, via port polling process 34, determines that another port has a data packet available for processing, packet completion fragmentation switching process 60 initiates packet fragmentation process 36 to fragment the data packet on the other port into cells $38_{1-N}$. This fragmentation process would continue until the user defined number of cells 33 are generated, or the packet is fully fragmented.

Figure 2:
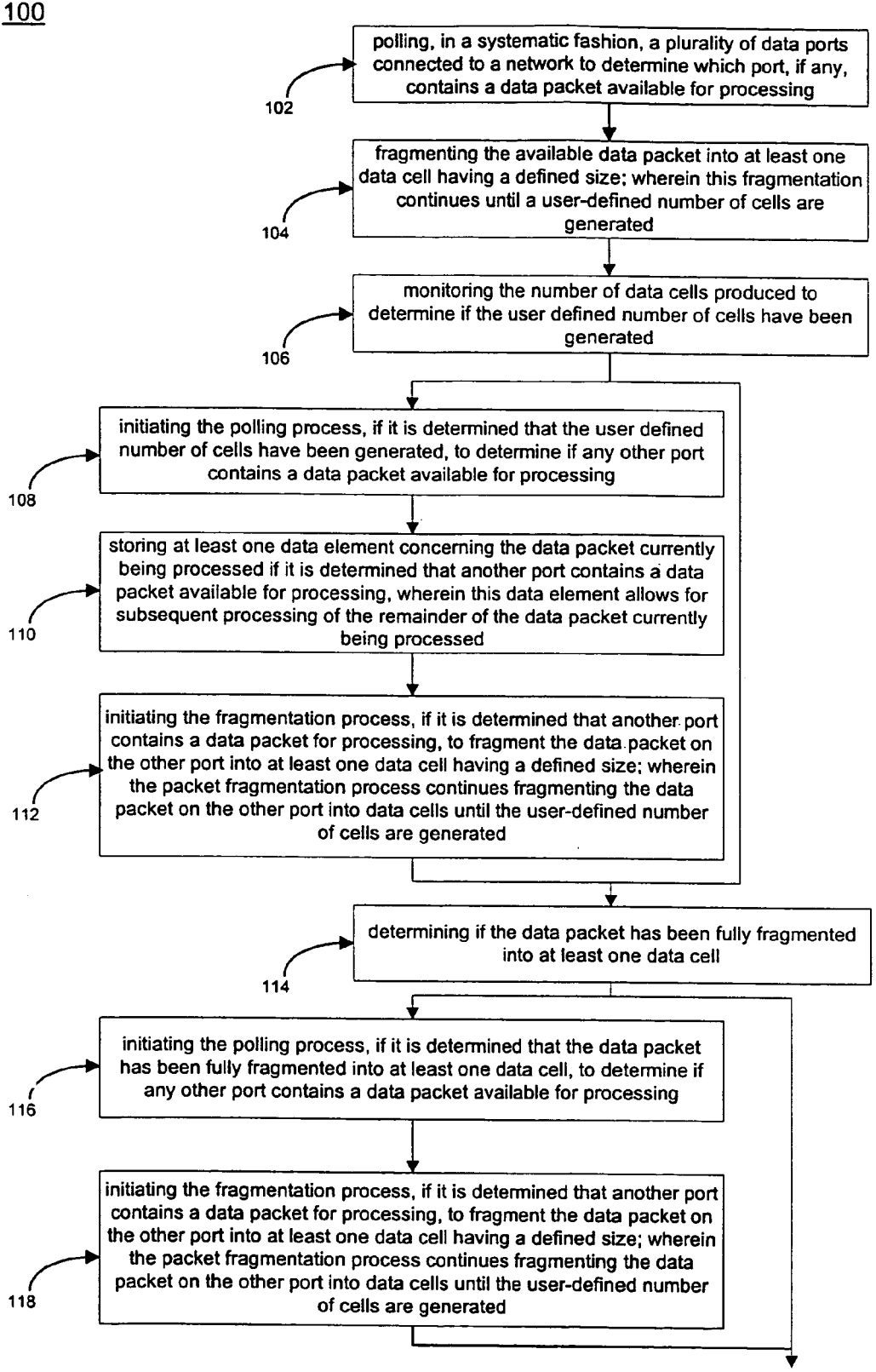
FIG. 2 is a flow chart of a programmable intra-packet switching method.

Now referring to FIG. 2, there is shown a programmable intra-packet switching method 100 in which a port polling process polls 102, in a systematic fashion, data ports connected to a network to determine which port, if any, contains a data packet available for processing. A packet fragmentation process fragments 104 the available data packet into at least one data cell having a defined size, where this fragmentation continues until a user-defined number of cells are generated.

A cell monitoring process monitors 106 the number of data cells produced to determine if the user defined number of cells have been generated. If so, a cell limit port switching process initiates 108 the polling process to determine if any other port contains a data packet available for processing. If such a data packet is available for processing, a packet information storage process stores 110 at least one data element concerning the data packet currently being processed, where the data element allows for subsequent processing of the remainder of the data packet currently being processed. Further, if such a data packet is available for processing, a cell limit fragmentation switching process initiates 112 the packet fragmentation process to fragment the data packet on the other port into at least one data cell having a defined size, where the packet fragmentation process continues fragmenting the data packet on the other port into data cells until the user-defined number of cells are generated.

A packet completion monitoring process determines 114 if the data packet being processed has been fully fragmented into at least one data cell. If it is determined that the data packet has been fully fragmented, a packet completion port switching process initiates 118 the polling process to determine if any other port contains a data packet available for processing. If it is determined that another port contains a data packet for processing, a packet completion fragmentation switching process initiates the fragmentation process to fragment the data packet on the other port into at least one data cell having a defined size, where the packet fragmentation process continues fragmenting the data packet on the other port into data cells until the user-defined number of cells are generated.

Once these cells are generated, processing can continue via processing circuitry (not shown) which allows for the subsequent manipulation or transmission of these cells on a cell-by-cell basis, as opposed to a packet-by-packet basis.

Figure 3:
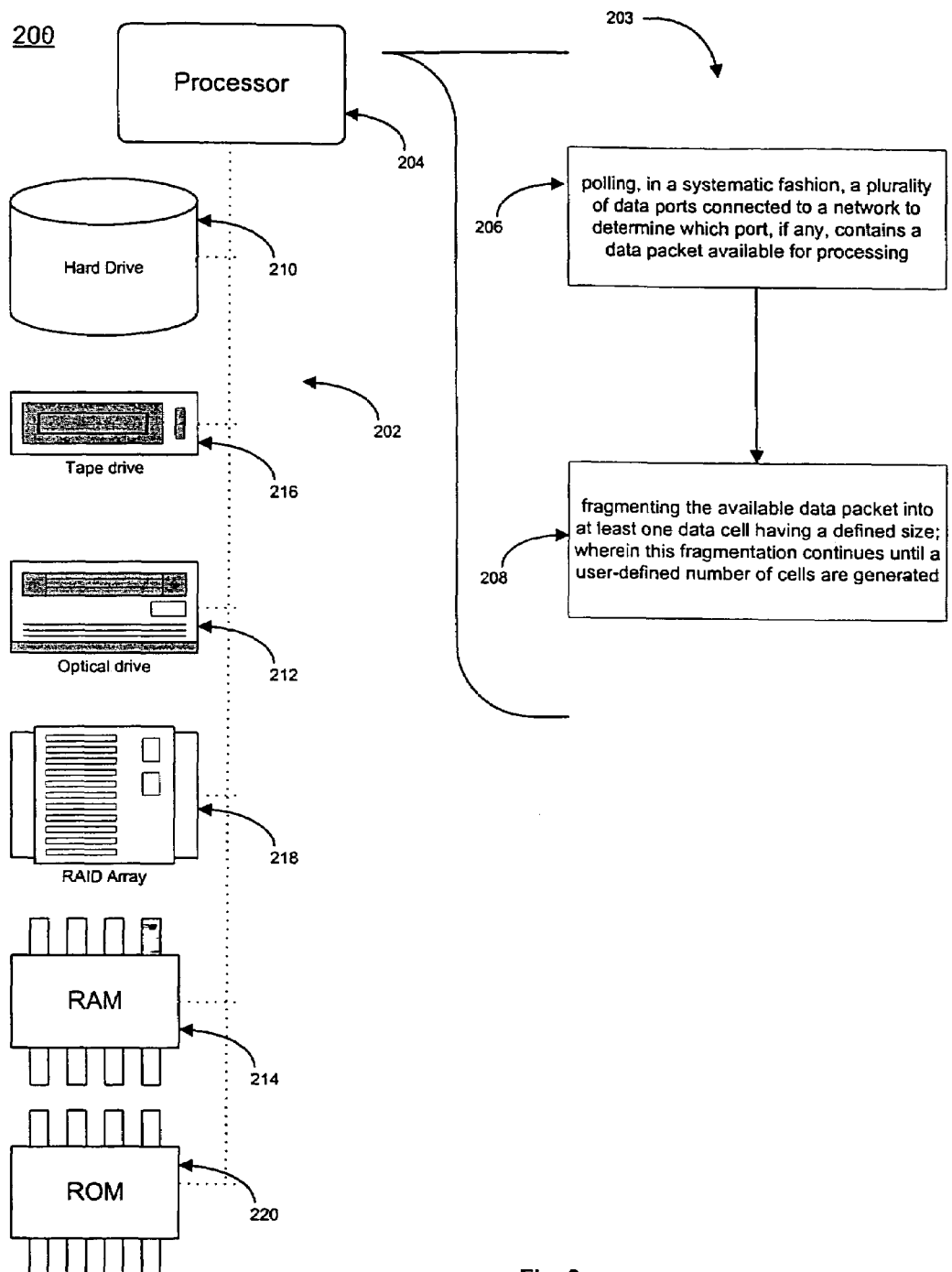
FIG. 3 is a diagrammatic view of another programmable intra-packet switching process.

Now referring to FIG. 3, there is shown a computer program product 200 which functions within a network signal processor circuit. Computer program product 200 resides on a computer readable medium 202 which has a plurality of instructions 203 stored thereon. When executed by processor 204, instructions 203 cause processor 204 to poll, in a systematic fashion, a plurality of data ports connected to a network to determine which port, if any, contains a data packet available for processing. Computer program product 200 fragments the available data packet into at least one data cell having a defined size, where this fragmentation continues until a user-defined number of cells are generated.

Typical embodiments of computer readable medium 202 are: hard drive 210; optical drive 212; random access memory 214; tape drive 216; RAID array 218; and read only memory 220.

Figure 4:
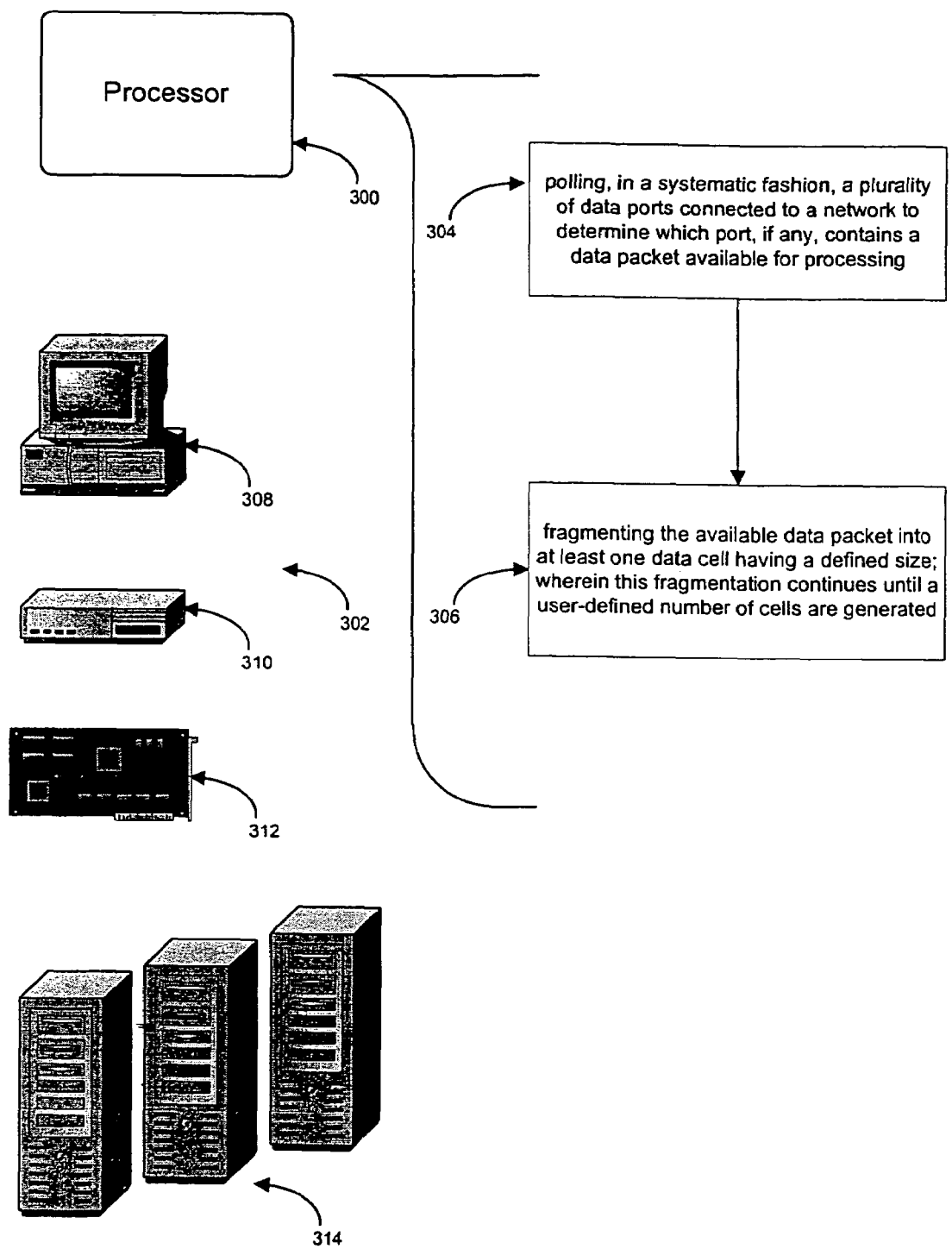
FIG. 4. is a diagrammatic view of another programmable intra-packet switching process.

Now referring to FIG. 4, there is shown a processor 300 and memory 302 configured to poll 304, in a systematic fashion, a plurality of data ports connected to a network to determine which port, if any, contains a data packet available for processing. Processor 300 and memory 302 fragment 306 the available data packet into at least one data cell having a defined size, where this fragmentation continues until a user-defined number of cells are generated.

Processor 300 and memory 302 may be incorporated into a personal computer 308, a programmable logic controller 310, a single board computer 312, or an array of network servers 314.

Other implementations are within the scope of the following claims.

What is claimed is:

1. A programmable intra-packet switching method comprising:

determining which, if any, of a plurality of data ports connected to a network contains a data packet available for processing;

fragmenting a first portion of a first available data packet into at least one data cell having a defined size; wherein this fragmentation of the first data packet continues until a user-defined number of cells are generated;

storing, in a memory, at least one data element concerning the first available data packet, wherein:

the at least one data element includes a data element indicative of the incomplete fragmentation status of said first available data packet; and the at least one data element enables fragmenting of a second portion of the first available data packet subsequent to fragmenting at least a portion of a second available data packet; and subsequent to fragmenting the first portion of the first data packet and prior to fragmenting the second portion of the first available data packet, fragmenting at least a portion of the second available data packet on a different one of the plurality of data ports.

2. The programmable intra-packet switching method of claim 1 further comprising:

monitoring the number of data cells produced to determine if the user defined number of cells have been generated.

3. The programmable intra-packet switching method of claim 2 wherein monitoring the number of data cells produced includes:

re-determining which, if any, of the plurality of data ports contains a data packet available for processing, if it is determined that the user defined number of cells have been generated, to determine if any other port contains a data packet available for processing.

4. The programmable intra-packet switching method of claim 3 wherein monitoring the number of data cells produced includes:

storing at least one data element concerning the data packet currently being processed if it is determined that another port contains a data packet available for processing, wherein this data element allows for subsequent processing of the remainder of the data packet currently being processed.

5. The programmable intra-packet switching method of claim 4 wherein monitoring the number of data cells produced includes:

initiating the fragmentation process, if it is determined that another port contains a data packet for processing, to fragment the data packet on the other port into at least one data cell having a defined size; wherein the packet fragmentation process continues fragmenting the data packet on the other port into data cells until the user-defined number of cells are generated.

6. The programmable intra-packet switching method of claim 1 further comprising:

determining if the data packet has been fully fragmented into at least one data cell.

7. The programmable intra-packet switching method of claim 6 wherein determining if the data packet has been fully fragmented includes:

re-determining which, if any, of the plurality of data ports contains a data packet available for processing, if it is determined that the data packet has been fully fragmented into at least one data cell, to determine if any other port contains a data packet available for processing.

8. The programmable intra-packet switching method of claim 7 wherein determining if the data packet has been fully fragmented includes:
initiating the fragmentation process, if it is determined that another port contains a data packet for processing, to fragment the data packet on the other port into at least one data cell having a defined size; wherein the packet fragmentation process continues fragmenting the data packet on the other port into data cells until the user-defined number of cells are generated.

9. The method of claim 1, wherein the at least one data element includes:
a data packet remainder length indicator, indicative of the length of the portion of said data packet not fragmented.

10. The method of claim 1, wherein the at least one data element includes:
an indicator indicative of the length of the portion of said data packet previously fragmented; and
an indicator indicative of a total length of the data packet.

11. The method of claim 1, wherein the at least one data element includes:
a data packet remainder length indicator, indicative of the length of the portion of said data packet not fragmented; and
an indicator indicative of a total length of the data packet.

12. The method of claim 1, further comprising, subsequent to fragmenting the first portion of the second data packet, fragmenting a second portion of the first available data packet into at least one data cell having a defined size.

13. The method of claim 12, wherein fragmenting the second portion of the first available data packet comprises using the at least one data element to enable fragmenting the second portion of the first available data packet.

14. The method of claim 1, wherein the user-defined number of cells comprises at least two cells.

15. The method of claim 1, wherein:
fragmenting the first portion of the first available data packet comprises using a signal processing circuit to fragment the first portion of the first available data packet; and
storing the at least one data element concerning the first available data packet comprises storing the at least one data element concerning the first available data packet in a memory included in the signal processing circuit.

16. A programmable intra-packet switching process comprising:
a port polling process for determining which, if any, of a plurality of data ports connected to a network contains a data packet available for processing;
a packet fragmentation process, responsive to said port polling process determining that a first one of said ports contains a first data packet, for fragmenting said first data packet into at least one data cell having a defined size; wherein said packet fragmentation process continues fragmenting said first data packet into said data cells until a user-defined number of cells are generated;
a packet information storage process for storing at least one data element concerning the first data packet, wherein said data element enables subsequent fragmenting of a second portion of the first data packet; and
a second packet fragmentation process for fragmenting at least a portion of a second available data packet on a different one of the plurality of data ports subsequent to fragmenting the first portion of the first data packet and prior to fragmenting the second portion of the first available data packet.

17. The programmable intra-packet switching process of claim 16 further comprising:
a cell limit monitoring process for monitoring the number of data cells produced by said packet fragmentation process to determine if said user defined number of cells have been generated.

18. The programmable intra-packet switching process of claim 17 wherein said cell limit monitoring process includes:
a cell limit port switching process, responsive to said cell limit monitoring process determining that said user defined number of cells have been generated, for initiating said polling process to determine if any other port contains a data packet available for processing.

19. The programmable intra-packet switching process of claim 16 wherein said at least one data element includes:
a data packet remainder length indicator, indicative of the length of the portion of said data packet not fragmented; and
a packet truncation indicator, indicative of the incomplete fragmentation status of said data packet.

20. The programmable intra-packet switching process of claim 18 wherein said cell limit monitoring process includes:
a cell limit fragmentation switching process, responsive to said cell limit port switching process determining that another port contains a data packet for processing, for initiating said packet fragmentation process to fragment said data packet on said other port into at least one data cell having a defined size; wherein said packet fragmentation process continues fragmenting said data packet on said other port into said data cells until said user-defined number of cells are generated.

21. The programmable intra-packet switching process of claim 16 further comprising:
a packet completion monitoring process for monitoring the status of said packet fragmentation process to determine if said data packet has been fully fragmented into said at least one data cell.

22. The programmable intra-packet switching process of claim 21 wherein said packet completion monitoring process includes:
a packet completion port switching process, responsive to said packet completion monitoring process determining that said data packet has been fully fragmented into said at least one data cell, for initiating said polling process to determine if any other port contains a data packet available for processing.

23. The programmable intra-packet switching process of claim 22 wherein said packet completion monitoring process includes:
a packet completion fragmentation switching process, responsive to said packet completion port switching process determining that another port contains a data packet for processing, for initiating said packet fragmentation process to fragment said data packet on said other port into at least one data cell having a defined size; wherein said packet fragmentation process continues fragmenting said data packet on said other port into said data cells until said user-defined number of cells are generated.

24. The programmable intra-packet switching process of claim 16 further comprising:
a user interface for allowing a user to specify at least one user-defined parameter utilized by said packet fragmentation process.

25. The programmable intra-packet switching process of claim 24 wherein said at least one user-defined parameter includes:
   said user-defined number of cells to be generated by said packet fragmentation process; and
   said defined size of said at least one data cell.

26. The programmable intra-packet switching process of claim 16 wherein said at least one data cell having a defined size is a 53-byte Asynchronous Transfer Mode (ATM) cell.

27. A programmable packet fragmentation process comprising:
   a process for determining the availability of a data packet on a plurality of data ports connected to a synchronous optical network;
   a packet fragmentation process, responsive to said process, said packet fragmentation process including:
      determining the availability of said data packet on one of said plurality of ports, for fragmenting a first portion of a first data packet into at least one Asynchronous Transfer Mode (ATM) cell, wherein said packet fragmentation process continues fragmenting said data packet into said data cells until a user-defined number of cells are generated;
      a packet information storage process for storing at least one data element concerning the first data packet, wherein said data element enables fragmenting of a second portion of the first data packet subsequent to fragmenting at least a portion of a second available data packet; and
      subsequent to fragmenting the first portion of the first data packet and prior to fragmenting the second portion of the first available data packet, fragmenting at least a portion of the second available data packet on a different one of the plurality of data ports.

28. The programmable intra-packet switching process of claim 27 further comprising:
   a cell limit monitoring process for monitoring the number of data cells produced by said packet fragmentation process to determine if said user defined number of cells have been generated.

29. The programmable intra-packet switching process of claim 27 further comprising:
   a packet completion monitoring process for monitoring the status of said packet fragmentation process to determine if said data packet has been fully fragmented into said at least one data cell.

30. A programmable intra-packet switching process comprising:
   a port polling process for determining which port, if any, of a plurality of data ports connected to a network contains a data packet available for processing;
   a packet fragmentation process, responsive to said port polling process:
      for determining that one of said ports contains a data packet,
      for fragmenting a first portion of a first data packet into at least one data cell; wherein said packet fragmentation process continues fragmenting said first data packet into said data cells until a port-switching event occurs;
      a packet information storage process for storing at least one data element concerning the first data packet, wherein said data element enables fragmenting of a second portion of the first data packet subsequent to fragmenting at least a portion of a second available data packet; and
      subsequent to a port-switching event packet and prior to fragmenting the second portion of the first available data packet, for fragmenting at least a portion of the second available data packet on a different one of the plurality of data ports.

31. The programmable intra-packet switching process of claim 30 wherein said port-switching event is an unbalanced port-loading condition.

32. The programmable intra-packet switching process of claim 30 wherein said port-switching event is the generation of a user-defined number of cells.

33. The programmable intra-packet switching process of claim 32 further comprising:
   a cell limit monitoring process for monitoring the number of data cells produced by said packet fragmentation process to determine if said user defined number of cells have been generated.

34. The programmable intra-packet switching process of claim 30 further comprising:
   a packet completion monitoring process for monitoring the status of said packet fragmentation process to determine if said data packet has been fully fragmented into said at least one data cell.

35. A computer program product residing on a computer readable medium having a plurality of instructions stored thereon which, when executed by the processor, cause that processor to:
   determine which port, if any, of a plurality of data ports connected to a network contains a data packet available for processing;
   fragment a first portion of a first available data packet into at least one data cell having a defined size; wherein this fragmentation continues until a user-defined number of cells are generated;
   storing at least one data element concerning the first available data packet, wherein the data element enables fragmenting of a second portion of the first available data packet subsequent to fragmenting at least a portion of a second available data packet; and
   fragment at least a portion of the second available data packet on a different one of the plurality of data ports, wherein this fragmentation occurs subsequent to the fragmentation of the first portion of the first data packet and prior to the fragmentation of the second portion of the first available data packet.

36. The computer program product of claim 35 wherein said computer readable medium is a read-only memory.

37. The computer program product of claim 35 wherein said computer readable medium is a random access memory.

38. A processor and memory configured to:
   determine which port, if any, of a plurality of data ports connected to a network contains a data packet available for processing;
   fragment a first portion of a first available data packet into at least one data cell having a defined size; wherein this fragmentation continues until a user-defined number of cells are generated;
   storing at least one data element concerning the first available data packet, wherein the data element enables fragmenting of a second portion of the first available data packet subsequent to fragmenting at least a portion of a second available data packet; and
   fragment at least a portion of the second available data packet on a different one of the plurality of data ports, wherein this fragmentation occurs subsequent to the fragmentation of the first portion of the first data packet and prior to the fragmentation of the second portion of the first available data packet.

39. The processor and memory of claim 38, wherein said processor and memory are incorporated into a single board computer.

40. The processor and memory of claim 38 wherein said processor and memory are incorporated into an Asynchronous Transfer Mode/Packet Over Sonet (ATM/POS) processor.

41. A programmable intra-packet switching method comprising:
   determining which, if any, of a plurality of data ports connected to a network contains a data packet available for processing;
   fragmenting at least a first portion of a first available data packet into at least one data cell having a defined size;
   monitoring the number of data cells produced to determine if a user defined number of cells have been generated;
   re-determining which, if any, of the plurality of data ports contains a data packet available for processing, if it is determined that the user defined number of cells have been generated, to determine if any other port contains a data packet available for processing;
   storing at least one data element concerning the data packet currently being processed if it is determined that another port contains a data packet available for processing, wherein:
   the at least one data element includes a first data element indicative of the incomplete fragmentation status of said first available data packet and a second data element selected from the group consisting of a data element indicative of the length of the portion of said data packet not fragmented and a data element indicative of the length of the portion of said data packet previously fragmented; and
   the at least one data element enables fragmenting of a second portion of the first available data packet subsequent to fragmenting at least a portion of a second available data packet;
   subsequent to fragmenting the first portion of the first data packet and prior to fragmenting the second portion of the first available data packet, fragmenting at least a portion of the second available data packet on a different one of the plurality of data ports; and
   subsequent to fragmenting the first portion of the second data packet, fragmenting a second portion of the first available data packet.

* * * * *